United States Patent [19]
Reinfelder et al.

[11] Patent Number: 5,273,398
[45] Date of Patent: Dec. 28, 1993

[54] ROTOR BLADE BALANCE WEIGHT ASSEMBLY

[75] Inventors: William C. Reinfelder, Woodbridge; Jeffry C. Purse, Branford, both of Conn.

[73] Assignee: United Technologies Corporation, Hartford, Conn.

[21] Appl. No.: 984,027

[22] Filed: Dec. 1, 1992

[51] Int. Cl.$^5$ .............................................. B64G 11/16
[52] U.S. Cl. ................... 416/144; 416/145; 416/500
[58] Field of Search ............... 416/145, 144, 500, 62; 73/455, 456

[56] References Cited

U.S. PATENT DOCUMENTS

| | | | |
|---|---|---|---|
| 2,435,604 | 2/1948 | Rorden | 416/144 |
| 2,494,756 | 1/1950 | Gruetjen | 416/145 |
| 3,999,888 | 12/1976 | Zincone | 416/145 |
| 4,078,422 | 3/1978 | Brunsch et al. | 73/65 |
| 4,150,920 | 4/1979 | Belko et al. | 416/145 |

FOREIGN PATENT DOCUMENTS

| | | | |
|---|---|---|---|
| 0181794 | 8/1986 | Japan | 416/500 |
| 0552745 | 4/1943 | United Kingdom | 416/144 |

Primary Examiner—Edward K. Look
Assistant Examiner—Mark Sgantzos
Attorney, Agent, or Firm—Michael Grillo

[57] ABSTRACT

A rotor blade balance weight assembly comprises a weight retention housing (10) having a hollow core (22) and being closed on one end (12). The housing is disposed in an aperture which extends from the upper (52) to the lower (53) airfoil surfaces of the rotor blade (50). The closure end of the housing is contoured to match the airfoil upper surface contour. A stud (70) extends along the central axis of the housing, and washer-like balance weights (72) are received over the stud and secured by a locking nut (75). The open end of the housing is closed by a cover plate (25) that is contoured to match the airfoil lower surface contour, the cover plate being secured to the housing by a nut (78) in locking engagement with the stud. A pair of clips (37) are received within the housing, each clip having a tab surface (40) which extends through slots (42) in the housing, the clips being secured by the locking nut and stud. The cover plate and housing closed end are counter sunk (17,59,27) to provide a smooth airfoil surface.

6 Claims, 2 Drawing Sheets

ROTOR BLADE BALANCE WEIGHT ASSEMBLY

DESCRIPTION

Technical Field

The present invention relates to helicopter rotor blades, and more particularly, to a rotor blade balance weight assembly for adjusting rotor blade chordwise and spanwise balance.

Background Of The Invention

In high speed helicopter rotor blades, accurate tip balancing is required for spanwise and chordwise balance. In composite rotor blades, one method of rotor blade balancing is by forming a cup or recess in the rotor blade which contains a fitting, usually with studs and nuts for mounting movable weights. A cover is secured over the recess for maintaining the rotor blade aerodynamic characteristics. Another method of attaching balance weights to rotor blades includes the use of attachment brackets bolted or riveted into the blade structure. The balancing weights are then secured to the brackets by a stud and nut or a bolt. In either case, the weight retention device serves only the one function of holding the weights. The weight of such devices does not contribute to the blade structural integrity, but only increases overall blade weight.

DISCLOSURE OF INVENTION

Objects of the invention include provision of a removable helicopter rotor blade balance weight assembly which provides accurate rotor blade tip balancing for spanwise and chordwise balance.

A further object of the invention is to provide a helicopter rotor blade balance weight assembly which contributes to the structural integrity of the rotor blade.

A still further object of the invention is to provide a helicopter rotor blade balance weight assembly which provides secure attachment of rotor blade components to a rotor blade spar when installed, and which provides access to interior portions of the rotor blade when removed.

According to the present invention, a weight retention housing having a hollow core and being closed on one end is disposed in an aperture which extends from the upper to the lower airfoil surfaces of a rotor blade. The closure end of the housing is contoured to match the airfoil upper surface contour. A stud extends along the central axis of the housing, and washer-like balance weights are received over the stud and secured by a locking nut within the housing. The open end of the housing is closed by a cover plate that is contoured to match the airfoil lower surface, the cover plate being secured to the housing by a recessed nut in locking engagement with the stud.

In further accord with the present invention, the housing is securely fastened to the airfoil upper surface by a pair of metal clips received within the housing, each clip having a tab surface which extends through slots formed in the side of the housing, the clips being secured by the locking nut and stud.

In still further accord with the present invention, the housing closed end and the cover plate have flared edges for engagement with the rotor blade airfoil surfaces, the housing closed end and the cover plate providing for the secure attachment of rotor blade components to the rotor blade spar when the cover plate is secured over the stud by the recessed nut.

The rotor blade balance weight assembly of the present invention provides a significant improvement over prior art rotor balancing assemblies. The removable housing provides access to the interior portion of the rotor blade that was previously not accomplished in the prior art. Such rotor blade access is particularly important in view of advanced rotor blade designs having blade skin and blade tips which are permanently bonded to the rotor spar.

On both the upper and lower airfoil surfaces of the rotor blade, a flared head is provided to lock the housing end and the cover plate into a mating countersink in the blade. The relatively large diameter of the housing provides a large bearing area against the blade components, e.g., the blade skin or blade tip, a feature especially important with composite blade construction. Additionally, the housing wall thickness can be easily varied to provide the required structural shear area to transfer loads through the housing. Therefore, the balance weight retention assembly of the present invention not only provides for increased overall blade weight, but also provides the added features of enhanced rotor blade structural integrity and retention of blade components such as the rotor blade tip.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

The rotor blade balance weight assembly of the present invention is particularly well suited for providing helicopter rotor blade tip balancing for spanwise and chordwise rotor blade balance. When the balance weight assembly is removed from the rotor blade, access is provided to the interior portions of the rotor blade. When installed, the balance weight assembly provides the further advantage of increasing the structural integrity of the rotor blade. Additionally, when fully assembled, the balance weight assembly provides the secure attachment of rotor blade components, such as the rotor blade tip end, to the rotor blade spar.

Figure 1:
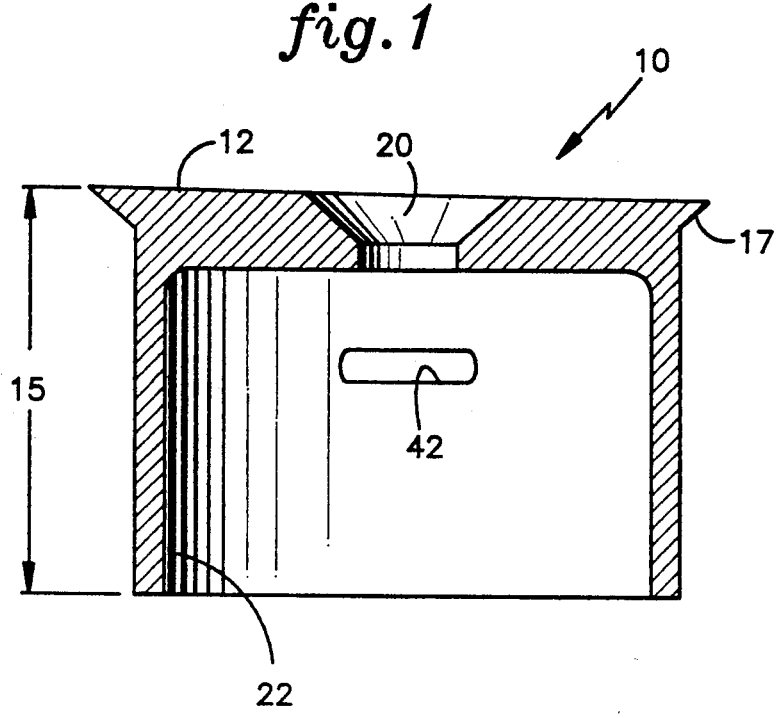
FIG. 1 is a cross-sectional view of a weight retention housing of the rotor blade balance weight assembly of the present invention.

Referring to FIG. 1, the balance weight assembly comprises a one-piece hollow housing 10 that is closed on one end 12. The inventions will be described herein with a cylindrical shaped housing 10 (cylinder); however, any suitably shaped housing may be used with the present invention as will be understood by those skilled in the art. The height 15 of the cylinder is selected to span the distance from a rotor blade upper airfoil surface to a rotor blade lower airfoil surface. Additionally, the closed end 12 of the cylinder is contoured to match the upper airfoil surface contour. A flared head 17 is formed at the closure end of the cylinder to mate with a countersink of an aperture formed in the rotor blade. Additionally, a countersink aperture 20 is formed at the center of the cylinder closure end for receiving a balance weight retention stud which will be described in greater detail with respect to FIG. 5. The cylinder may be machined from a high strength, lightweight metal, such as aluminum or preferably titanium, or in some applications may be molded of a high strength, lightweight composite material to the required shape. The closure end flared head and bolt countersink may be machined, forged or molded as required.

Figure 2:
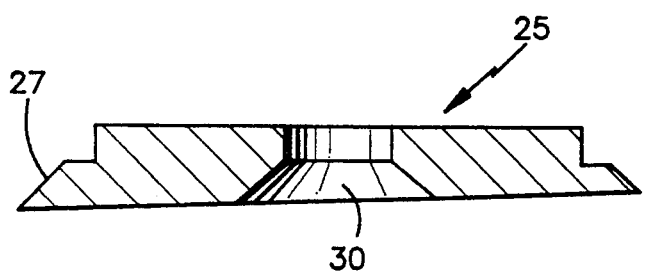
FIG. 2 is a cross-sectional view of a cover plate of the balance weight assembly of FIG. 1.

The open end 22 of the cylinder is closed by a cover plate 25 which is shown in FIG. 2. Referring to FIG. 2, the cover plate is shaped to fit into the end of the cylinder and bear against the edge of the cylinder, and also has a flared head 27, that fits into a mating countersink formed in the rotor blade airfoil lower surface. A countersink aperture 30 is formed in the center of the cover plate cylinder for receiving a recessed locking nut, which will be described in greater detail with respect to FIG. 5.

Figure 3A:
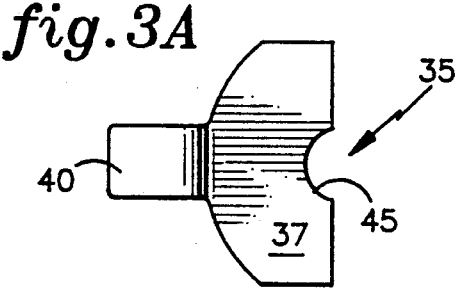
FIG. 3A is a top view of a retention clip of the balance weight assembly of FIG. 1.
Figure 3B:
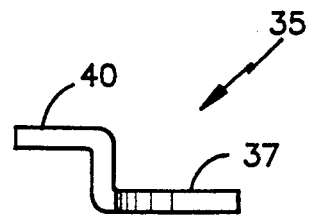
FIG. 3B is a side view of the retention clip of FIG. 3.
Figure 4:
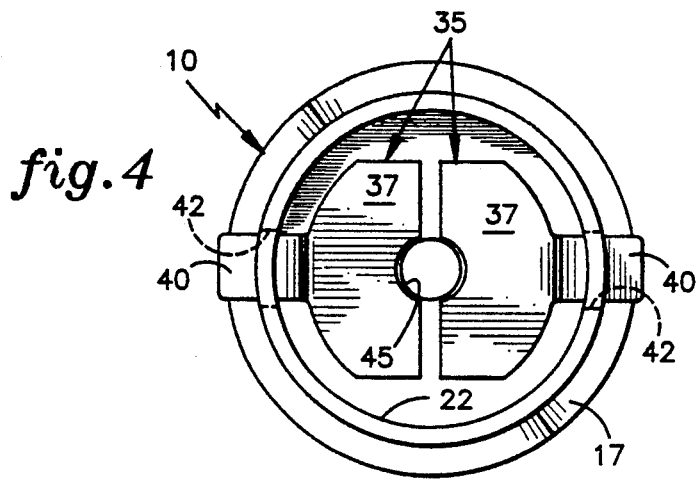
FIG. 4 is a top view of the housing of FIG. 1 showing the retention clips of FIG. 3 installed within the housing.

Retention clips are used to securely attach the cylinder to the rotor blade airfoil upper surface. Referring to FIGS. 3 and 4, each of the retention clips 35 comprises a balance weight portion 37 and a retention tab 40. The design of the clips allows insertion through the interior diameter bore of the cylinder. A pair of opposing apertures 42 (FIGS. 1 and 4) are formed in the cylinder 10 to receive the retention tabs 40. Cutouts 45 are formed in the balance weight portion of the retention clips so that the stud may pass down the center axis of the cylinder when the clips are installed in the cylinder, as shown in FIG. 4.

Figure 5:
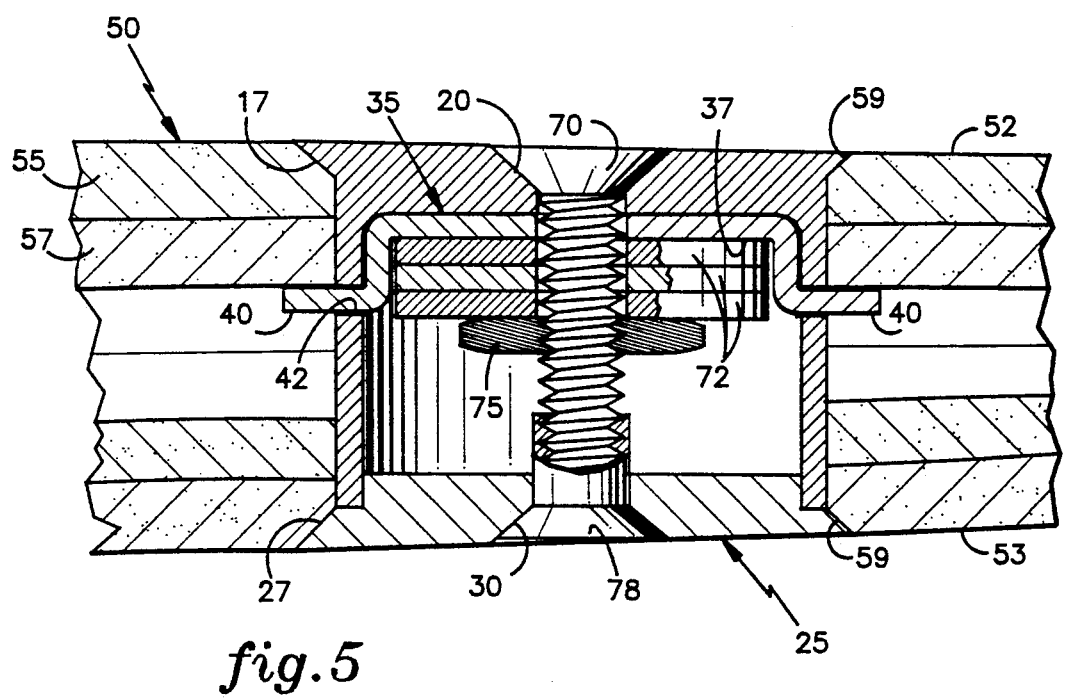
FIG. 5 is a cross-sectional view showing the balance weight assembly of the present invention installed in a helicopter rotor blade.

Referring now to FIG. 5, the rotor blade balance weight assembly of the present invention is shown installed on a helicopter rotor blade 50. An aperture is formed in the rotor blade extending from the upper airfoil surface 52 to the lower airfoil surface 53. The aperture extends through the various rotor blade layers including the skin 55 and the spar 57. Typically, the balance weight assembly is installed near the tip end of the rotor blade, and therefore the skin layer 55 is the skin of the rotor blade tip. Therefore, when the balance weight assembly is installed, it provides the further advantage of securely holding the skin layer 55 to the spar layer 57 of the rotor blade, as will be described in greater detail hereinafter.

The aperture is sized to snugly receive the cylinder. The aperture openings on the airfoil upper and lower surfaces provide countersink surfaces 59 for the flare of the cylinder closure end 17 and the cover plate 27. During assembly, the cylinder is inserted through the aperture of the rotor blade. Bonding material, such as epoxy, is disposed between the cylinder and the airfoil surfaces which form the aperture to securely hold the cylinder within the aperture. Next, the retention clips 35 are inserted through the open end of the cylinder such that the tabs 40 are received through the opposing apertures 42 in the cylinder. The retention stud 70 is inserted through the aperture 20 formed in the closed end of the cylinder. The retention stud has a flared head to mate with the aperture countersink 20. A plurality of washer-like balance weights 72 are received over the stud for providing the required spanwise and chordwise rotor blade balance. A locking nut 75 is then installed on the stud 70 to securely hold the balance weights 72 and retention clips 40 against the closure end of the cylinder. A known thread-locking material may be inserted between the locking nut threads and stud threads to securely hold the locking nut 75 in place. Alternatively, other mechanical locking means may be used to lock the nut 75 in place.

As will be understood by those skilled in the art, when the locking nut 75 is securely fastened to the stud 70, the retention clips 40 securely hold the cylinder to the upper airfoil surface 52 to provide additional retention of the balance weight assembly. Adhesive material, such as epoxy, may be disposed between the interior surfaces of the upper airfoil and the retention tabs 40 to securely hold the tabs in place.

Once the appropriate balance weights are locked in place by the locking nut 75, the cover plate 25 is installed over the open end of the cylinder 10. A locking nut 78 having a tapered head is inserted through the cover plate countersink aperture and secured to the stud 70. Known thread-locking material may be disposed between the locking nut threads and stud threads, or other mechanical locking devices may be used to securely fasten the locking nut 78 to the stud 70. To provide additional retention of the cover plate, adhesive material, such as epoxy, may be disposed between the cover plate and the cylinder and lower airfoil surfaces to securely hold the cover plate in place. Additionally, adhesive material, such as epoxy, may be disposed above the stud head and locking nut head to provide a smooth airfoil surface.

Prior to assembly of the balance weight assembly of the present invention, access is provided to the interior portions of the rotor blade through the aperture. Once installed, the cylinder adds to the structural integrity of the rotor blade, and the flare of the cylinder closure end 17 and the cover plate 27 provide for retention of blade components. For example, when the balance weight assembly is installed near the tip end of the blade, is provides for additional retention of the rotor blade tip to the spar.

The invention was described using a cylindrically shaped housing 10; however, any suitably shaped housing may be used with the present invention. It will be further understood by those skilled in the art that the shape of the housing may be selected to provide desired size and strength characteristics.

Although the balance weight assembly is described herein as being installed using adhesive material, such a epoxy, the invention will work equally as well with the cylinder fastened to the upper airfoil surface by the retention clips 45, and the cover plate securely held in place by the locking nut 78. As will be understood by those skilled in the art, any suitable means of securely locking the locking nuts 75,78 in place may be used without departing from the spirit or scope of the present invention.

Although the invention has been described and illustrated with respect to exemplary embodiments thereof, it should be understood by those skilled in the art that the foregoing and various other changes, omissions and additions may be made therein and thereto, without departing from the spirit and scope of the present invention.

We claim:

1. A rotor blade balance weight assembly for installation in an aperture formed in a rotor blade, the aperture extending through the entire thickness of the rotor blade from an upper airfoil surface to a lower airfoil surface, the assembly comprising;
- a weight retention housing having a hollow core, a closed end and an opposing open end, the outside diameter of said housing being contoured such that it fits snuggle within said rotor blade aperture;
- a stud centrally located in said housing core, one end of said stud being fixed to said housing closed end;
- at least one balance weight having an outside diameter conforming to said housing core, each balance weight having a central aperture through which said stud extends;
- first fastening means received onto the other end of said stud for holding said balance weights in said housing core;
- a cover plate conforming to said housing open end and having a central aperture;
- second fastening means received through said cover plate aperture and received onto the other end of said stud for holding said cover plate over said housing open end;
- a pair of slots formed on diametrically opposed sides of said housing; and
- a pair of clips each having a tab surface which extends through one of said slots, and a balance weight portion having a cutout through which said stud extends, said clips being held in said housing core by said first fastening means and said tabs extending beyond the outside diameter into a central void of said rotor blade.

2. A rotor blade balance weight assembly according to claim 1 further comprising:
- a countersink surface formed on said upper and lower airfoil surfaces around the outside diameter of said aperture;
- a flared surface formed on said housing closed end for mating engagement with one of said airfoil countersink surfaces;
- a flared surface formed on said cover plate for mating engagement with the other of said airfoil countersink surface;
- said housing closed end and said cover plate providing for secure attachment of said balance weight assembly to said rotor blade when said second fastening means is received through said cover plate aperture and mounted onto the other end of said stud.

3. A rotor blade balance weight assembly according to claim 1 wherein said housing closed end and said cover plate conform to the airfoil contour of the rotor blade.

4. A rotor blade balance weight assembly according to claim 1 further comprising adhesive means disposed between said housing and said rotor blade and between said cover plate and said housing and rotor blade for securely mounting said assembly to said rotor blade.

5. A rotor blade balance weight assembly for installation in an aperture formed in a rotor blade, the aperture extending through the entire thickness of the rotor blade from an upper airfoil surface to a lower airfoil surface, a countersink surface being formed on said upper and lower airfoil surfaces around the outside diameter of said aperture, the assembly comprising:
- a weight retention housing having a hollow core, a closed end and an opposing open end, the outside diameter of said housing being contoured such that it fits snugly within said rotor blade aperture;
- said housing closed end forming a portion of the rotor blade skin and conforming to the upper airfoil contour, said housing closed end having a flared surface for mating engagement with said upper airfoil countersink surface;
- a stud centrally located in said housing core, one end of said stud being fixed to said housing closed end;
- at least one balance weight having an outside diameter conforming to said housing core, each balance weight having a central aperture through which said stud extends;
- a clamping nut threaded onto the other end of said stud for holding said balance weights in said housing core;
- a cover plate conforming to said housing open end and having a central countersink aperture;
- said cover plate forming a portion of the rotor blade skin and conforming to the lower airfoil contour, said cover plate having a flared surface for mating engagement with said lower airfoil countersink surface;
- a screw extending through said coverplate aperture and threaded onto the other end of said stud for holding said cover plate over said housing open end, said screw having a flared head for mating engagement with said cover plate central countersink aperture;
- a pair of slots formed on diametrically opposed sides of said housing; and
- a pair of clips each having a tab surface which extends through one of said slots, and a balance weight portion having a cutout through which said stud extends, said clips being held in said housing core by said clamping nut and said tabs extending beyond the outside diameter into a central void of said rotor blade.

6. A rotor blade balance weight assembly according to claim 5 further comprising adhesive means disposed between said housing and said rotor blade and between said cover plate and said housing and rotor blade for securely mounting said assembly to said rotor blade.

* * * * *